(12) United States Patent
Khare

(10) Patent No.: US 10,003,857 B2
(45) Date of Patent: *Jun. 19, 2018

(54) METHOD AND SYSTEM FOR INSERTING A LOCAL TELEVISION CONTENT AND A REGIONAL ADVERTISEMENT UNDER CENTRALIZED CONTROL

(75) Inventor: Rajendra Kumar Khare, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 0 days. days.

This patent is subject to a terminal disclaimer.

(21) Appl. No.: 13/206,488

(22) Filed: Aug. 9, 2011

(65) Prior Publication Data

US 2013/0191865 A1    Jul. 25, 2013

(30) Foreign Application Priority Data

Aug. 9, 2010   (IN) ............................ 2285/CHE/2010

(51) Int. Cl.
| | |
|---|---|
| *H04N 21/81* | (2011.01) |
| *H04N 21/262* | (2011.01) |
| *H04N 21/2668* | (2011.01) |
| *H04N 21/222* | (2011.01) |
| *H04N 21/234* | (2011.01) |

(52) U.S. Cl.
CPC ....... *H04N 21/812* (2013.01); *H04N 21/2668* (2013.01); *H04N 21/26241* (2013.01); *H04N 21/2221* (2013.01); *H04N 21/23424* (2013.01)

(58) Field of Classification Search
CPC ............ H04N 21/254; H04N 21/2665; H04N 21/812; H04N 21/2221; H04N 21/23424; H04N 21/26241; H04N 21/2668; G06Q 30/0251
USPC ............................................... 725/32, 35–36
See application file for complete search history.

(56) References Cited

U.S. PATENT DOCUMENTS

| | | | | |
|---|---|---|---|---|
| 2001/0025377 | A1* | 9/2001 | Hinderks | H04L 12/1859 725/109 |
| 2002/0067730 | A1* | 6/2002 | Hinderks | G06Q 30/02 370/395.52 |
| 2003/0174837 | A1* | 9/2003 | Candelore | H04N 7/162 380/210 |

(Continued)

*Primary Examiner* — Benjamin R Bruckart
*Assistant Examiner* — Jen-Shi Huang
(74) *Attorney, Agent, or Firm* — Barry Choobin; Patent 360 LLC

(57) ABSTRACT

A system and method for inserting a regional advertisement and a local television content under centralized control. The system includes a user interface for receiving a media plan from an advertiser. The system also includes a media server including a memory and a processor to insert at least one of a local television content and a regional advertisement from a centralized studio. Further, the system includes one or more edge devices for fetching and inserting at least one of the local television content and the regional advertisement into a central network feed for a pre-determined time period. The method includes fetching a local television content from a local storage device, specifying a pre-determined time period within the central network feed and inserting the local television content for the pre-determined time period into the central network feed. The system implementing the method is implemented for radio content and advertising.

5 Claims, 3 Drawing Sheets

(56) References Cited

U.S. PATENT DOCUMENTS

| | | | |
|---|---|---|---|
| 2004/0194130 A1* | 9/2004 | Konig et al. | 725/32 |
| 2004/0244035 A1* | 12/2004 | Wright | H04H 20/28 725/32 |
| 2005/0028193 A1* | 2/2005 | Candelore | H04N 7/1675 725/32 |
| 2005/0057724 A1* | 3/2005 | Patton | G06Q 30/02 352/40 |
| 2007/0067297 A1* | 3/2007 | Kublickis | 707/9 |
| 2007/0250856 A1* | 10/2007 | Leavens et al. | 725/36 |
| 2008/0155591 A1* | 6/2008 | Mahajan | G06Q 30/02 725/34 |
| 2009/0044217 A1* | 2/2009 | Lutterbach et al. | 725/34 |
| 2009/0241142 A1* | 9/2009 | Schuster et al. | 725/32 |
| 2009/0254931 A1* | 10/2009 | Pizzurro et al. | 725/5 |
| 2010/0023395 A1* | 1/2010 | Bugenhagen | 705/14.45 |
| 2010/0023958 A1* | 1/2010 | Bugenhagen | 725/1 |
| 2010/0082488 A1* | 4/2010 | Evans et al. | 705/59 |
| 2010/0083303 A1* | 4/2010 | Redei et al. | 725/32 |
| 2010/0162288 A1* | 6/2010 | Huffman | H04H 20/14 725/22 |
| 2010/0241511 A1* | 9/2010 | Cunningham et al. | 705/14.46 |
| 2011/0142417 A1* | 6/2011 | Wilson | H04N 5/76 386/250 |
| 2013/0031582 A1* | 1/2013 | Tinsman et al. | 725/36 |
| 2013/0160045 A1* | 6/2013 | Khare | 725/32 |
| 2014/0196080 A1* | 7/2014 | Bugenhagen | 725/32 |

* cited by examiner

METHOD AND SYSTEM FOR INSERTING A LOCAL TELEVISION CONTENT AND A REGIONAL ADVERTISEMENT UNDER CENTRALIZED CONTROL

This application claims priority from Indian Provisional Application Serial No. 2285/CHE/2010 filed on Aug. 9, 2010 entitled "METHOD AND SYSTEM FOR AUTOMATING FUNCTIONS OF A STUDIO PLAYOUT SYSTEM", which is hereby incorporated in its entirety.

TECHNICAL FIELD

Embodiments of the disclosure relate to the field of advertising and more specifically to the field of advertising on television and radio.

BACKGROUND

Distributing an advertisement on a television and radio is being widely utilized by advertisers for advertising one or more products and services. One of the methods for distributing the advertisement so that it reaches out to relevant users includes inserting a regional advertisement into a regional television or regional radio content. An appropriate regional advertisement is mixed with regional television or regional radio content for an allocated commercial time at a local studio by a local studio operator. This provides relevant viewership for the regional advertisement by viewers specific to a particular geographical area, thereby obtaining increased revenue. However, this technique does not allow an all-region advertisement that is distributed from a centralized studio to be inserted within the locally inserted regional content. This technique also does not allow regional advertisements to be inserted within the central studio content such that a regional advertisement so inserted is viewed only within the desired region.

In the light of the foregoing discussion there is a need for a method and a system to utilize the allocated commercial time efficiently to obtain increased revenue.

SUMMARY

The above-mentioned needs are met by a system and a method for inserting local television content and a regional advertisement under centralized control.

An example of a system includes a user interface for receiving a media plan from an advertiser. The system also includes a media server. The media server includes a memory that stores instructions and a processor responsive to the instructions to fetch at least one of the local television content from a local storage device or at least one of an all region advertisement and the regional advertisement from the media server, and insert at least one of a local television content and a regional advertisement from a centralized studio. The system further includes one or more edge devices for fetching at least one of the local television content and the regional advertisement from a local storage device and for inserting at least one of the local television content and the regional advertisement into a central network feed for a pre-determined time period. The edge devices can also insert the all-region advertisement into one of the central network feed and the local television content.

An example of a method of inserting a regional advertisement and a local television content under centralized control includes fetching a local television content from a local storage device that may also be attached through network. The method also includes specifying a pre-determined time period within a central network feed. The method further includes inserting the local television content for the pre-determined time period into the central network feed.

DETAILED DESCRIPTION OF THE EMBODIMENTS

The above-mentioned needs are met by a system and a method for inserting a local television content and a regional advertisement under centralized control. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
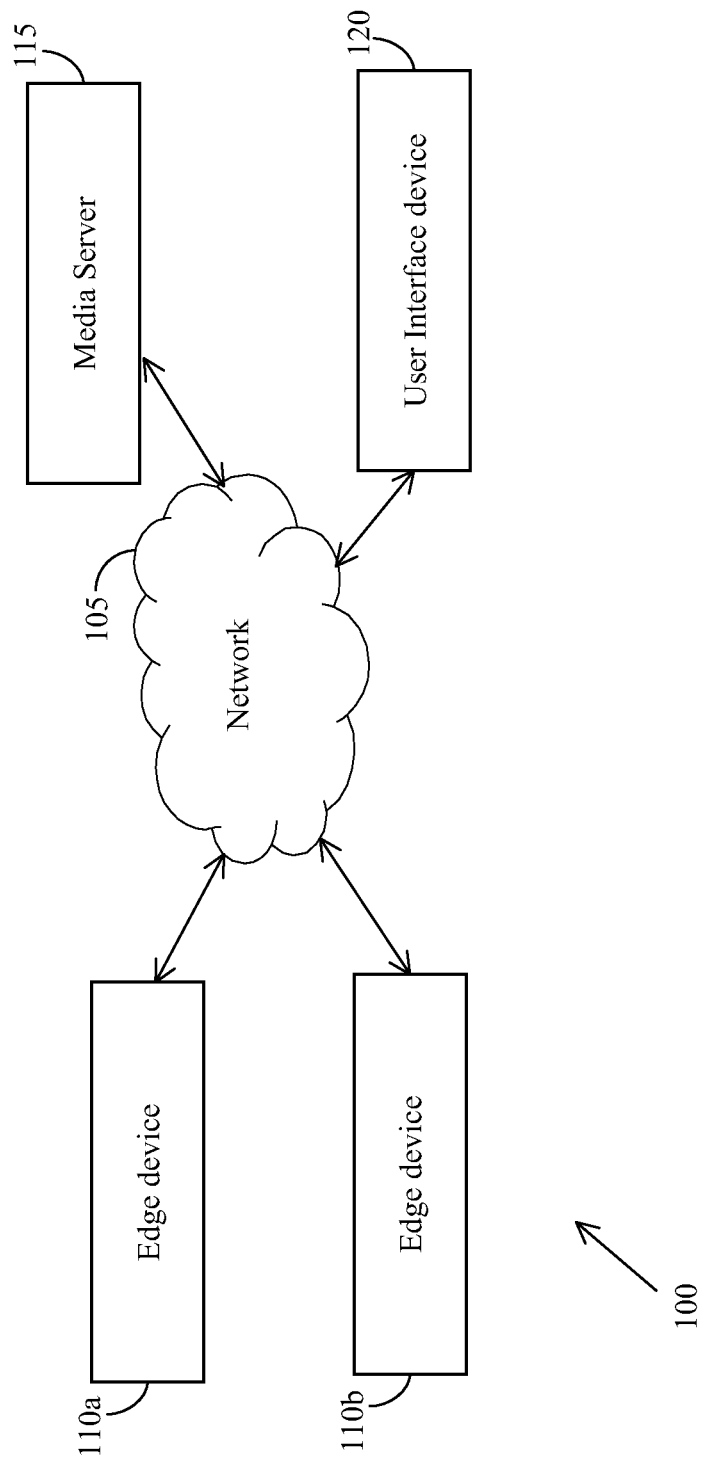
FIG. 1 is a block diagram of an environment, in accordance with which various embodiments can be implemented.

FIG. 1 is a block diagram of an environment 100, in accordance with which various embodiments can be implemented.

The environment 100 includes a user interface device 120 connected to the network 105. Examples of the user interface device 120 include, but are not limited to, computers, mobile devices, laptops, palmtops, hand held devices, telecommunication devices and personal digital assistants (PDAs). The environment 100 also includes one or more edge devices, for example an edge device 110a and an edge device 110b connected to the network 105. The environment 100 further includes a media server 115 connected to the network 105.

The media server 115 is in electronic communication with the edge device 110a, the edge device 110b and the user interface device 120 through the network 105. Examples of the network 105 include, but are not limited to, a Local Area Network (LAN), a Wireless Local Area Network (WLAN), a Wide Area Network (WAN), internet, and a Small Area Network (SAN). The media server 115 can be located remotely with respect to the one or more edge devices.

The media server 115 can be regarded as a platform for integrating one or more advertisements, various television channels and various television contents such as nationalized television contents and local television contents based on a media plan to achieve an increased viewership. The one or more advertisements for distribution are obtained based on a television program genre, geographical area, a television channel and a distribution area. Further, the one or more advertisements include a combination of various regional advertisements and various all-region advertisements.

The regional advertisements are distributed on television channels airing various local television contents by a local studio office (LCO). The regional advertisements can be viewed by users belonging to a specific geographical area. The media server 115 provides a platform for storing various regional advertisements that can be inserted within the content coming from the central network feed or within the local content inserted at the local studio so that users belonging to a specific geographical area can view the regional advertisements in addition to the all-region advertisements distributed on the central network feed. Further, the media server 115 also provides a platform for storing various all-region advertisements. The all-region advertisements are distributed on all the regions where the channel is distributed.

The media server 115 enables an advertiser to identify the various local television contents that are distributed by the LCO and further, enables the advertiser to advertise products and services to users located in the specific geographical area viewing the local television contents under a centralized control.

The media server 115 receives an order booking from the advertiser for a regional advertisement into the central network feed. The media server 115 maintains a list of local television content to be inserted into the central network feed. The media server 115 also maintains a list of regional advertisements to be inserted into the central network feed. Further, the media server 115 maintains a pre-determined time period specified by the advertiser during which the regional advertisement can be inserted into the central network feed. A Mark-in and a Mark-out montage are used by the media server 115 to maintain the pre-determined time period. Hence, inserting the local television content and the regional advertisement at a specified time period into the central network feed enables the advertiser to obtain increased revenues.

The media server 115 can be laid on a cloud network for providing increased scalability, availability and accessibility to the advertiser. The advertiser, for example, a local advertiser or a national advertiser can also access the media server 115 through an internet portal.

The media server 115 also enables scheduling of the local television content and the regional advertisement for distribution into the central network feed for the pre-determined time period. Scheduling helps displaying relevant advertisements at specified time periods and thus improving viewership ratings. The media server 115 also enables scheduling various banner advertisements that can be over-laid on the central network feed based on various locations.

The media server 115 also controls the one or more edge devices.

The edge device 110a and the edge device 110b are connected to the media server 115 through the network 105 to fetch a regional advertisement from the media server 115. The edge device can also be regarded as a media station that can be deployed at one or more distributing stations. Examples of distributing stations include, but are not limited to, central studio, regional Multiple System Operators (MSO) head ends, Local Cable Operators (LCO) and Direct to Home (DTH) up-linking centres, FM/AM Radio Stations and Local Community Radio Stations. The edge device 110a can also be used to fetch a local television contents from a local storage device.

The edge device 110a is integrated with various standard play-out systems at various distributing stations for distributing one or more television contents at specified time periods.

The edge device 110a further inserts the local television content into the central network feed for the pre-determined time period. Furthermore, the edge device 110a also inserts the regional advertisement fetched from the media server 115 into the central network feed as per media plan. The edge device 110a is also configured to insert an all region advertisement into a locally inserted television content as per media plan.

The edge device 110a is also configured to generate a playlist including a list of advertisements to be displayed during a commercial break. The list of advertisements can include a combination of various regional advertisements and various all-region advertisements.

The edge device 110a is also configured to embed one of the Mark-in and the Mark-out montage containing pre-determined audio cue tones or pre-determined video image pattern within the playlist that can be recognized by the down-stream edge devices 110b located at local distribution centers to begin the insertion of the regional advertisement into the central network feed for the pre-determined time period. Further, the Mark-in and the Mark-out montage can also be used to insert the local television content into the central network feed for the pre-determined time period by the edge device 110a. The Mark-in and the Mark-out montage can be used to pause and resume playing of the local television content from the centralized studio.

Further, the edge device 110a can also be used to fetch a local radio content from a from a local storage device located at a radio distributing station. The edge device 110a is integrated with various standard play-out systems at various radio distributing stations for distributing one or more radio contents at specified time periods. The edge device 110a further inserts the local radio content into the centralized radio feed under the centralized control for the pre-determined time period. Furthermore, the edge device 110a also inserts the regional advertisement and the all-region advertisement fetched from the media server 115 into the centralized radio content as per media plan. Moreover, the edge device 110a is also configured to insert the all-region advertisement into the local radio content from the centralized control.

The user interface 120 is used by the advertiser to provide a media plan as an input. The media plan is used to define the distribution of various advertisements into various television channels such that maximum revenue is obtained. The user interface 120 is also used by the advertiser to provide the order booking. The order booking can define a local television content that is required to be inserted into the central network feed at a specified time. Further, the order booking also defines a regional advertisement that is required to be inserted into the central network feed at a specified time. Furthermore, the order booking also specifies a national television content or an all region advertisement that is required to be inserted into a local television channel at a specified time.

Figure 2:
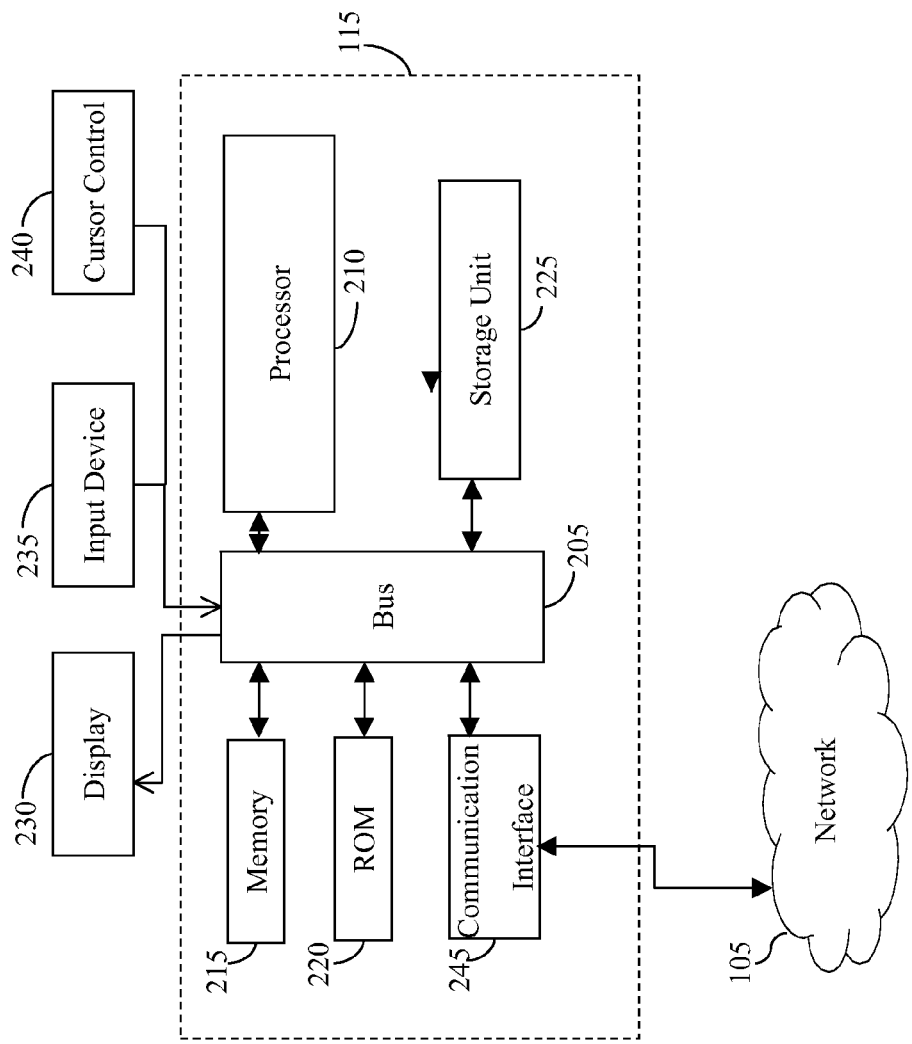
FIG. 2 is a block diagram of a media server for inserting a local television content and a regional advertisement under centralized control, in accordance with one embodiment.

The media server 115 including a plurality of elements is explained in detail in conjunction with FIG. 2.

FIG. 2 is a block diagram of a media server for inserting a local television content and a regional advertisement under centralized control, in accordance with one embodiment.

The media server 115 includes a bus 205 or other communication mechanism for communicating information, and a processor 210 coupled with the bus 205 for processing information. The media server 115 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The media server 115 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example a list of regional advertisements, a list of all-region advertisements and various local television contents to be distributed on a central network feed from a centralized control.

The media server 115 can be coupled via the bus 205 to a display 230, for example a cathode ray tube (CRT), for displaying the list of regional advertisements and various local television contents. The input device 235, including alphanumeric and other keys, is coupled to the bus 205 for communicating information and command selections to the processor 210. Another type of user input device is the cursor control 240, for example a mouse, a trackball, or cursor direction keys for communicating direction information and command selections to the processor 210 and for controlling cursor movement on the display 230.

Various embodiments are related to the use of the media server 115 for implementing the techniques described herein. In some embodiments, the techniques are performed by the media server 115 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the media server 115, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that include the bus 205. Transmission media can also take the form of acoustic or light waves, such as those generated during radio-wave and infra-red data communications. Examples of machine-readable media may include, but are not limited to, a carrier wave as described hereinafter or any other media from which the media server 115 can read. For example, the instructions can initially be carried on a magnetic disk of a remote computer. The remote computer can load the instructions into its dynamic memory and send the instructions over a telephone line using a modem. A modem local to the media server 115 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The media server 115 also includes a communication interface 245 coupled to the bus 205. The communication interface 245 provides a two-way data communication coupling to the network 105. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. In any such implementation, the communication interface 245 sends and receives electrical, electromagnetic or optical signals that carry digital data streams representing various types of information.

The processor 210 in the media server 115 is responsive to the instructions to insert a local television content and a regional advertisement from the centralized studio into the central network feed. The processor 210 further schedules the local television content and the regional advertisement for distribution into the central network feed for the pre-determined time period. An edge device, for example, the edge device 110a fetches the local television content from the media server 115 and further inserts the local television content into the central network feed. Further, the edge device 110a also fetches the regional advertisement for inserting into the central network feed for the pre-determined time period as specified by the advertiser. The edge device 110a can also include a plurality of elements similar to the elements of the media server 115 fetching at least one of the local television content and the regional advertisement from a local storage device and further for inserting at least one of the local television content and the regional advertisement into a central network feed for a pre-determined time period.

Figure 3:
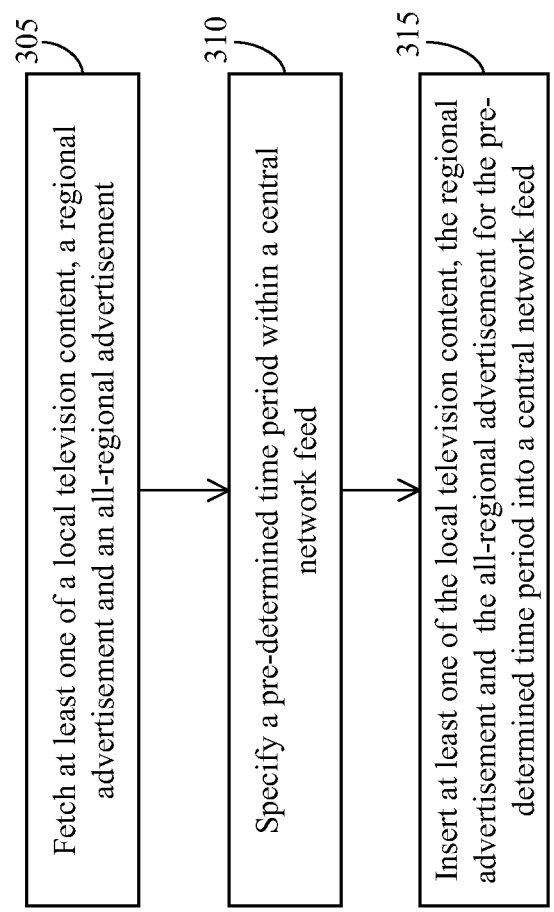
FIG. 3 is a flowchart illustrating a method of for inserting a local television content and a regional advertisement under centralized control, in accordance with one embodiment.

FIG. 3 is a flowchart illustrating a method of inserting a local television content and a regional advertisement under centralized control, in accordance with one embodiment.

At step 305, a local television content is fetched from a local storage device. The local television content can also be fetched from an LCO. The local television content is viewed by users of a specific geographical area. The local television content is fetched by an edge device, for example, the edge device 110a. The local television content is fetched for insertion and distribution on a central network feed from a centralized control.

Further, the step 305 also includes fetching a regional advertisement from a media server, for example, the media server 115. The regional advertisement fetched is used for distribution from the centralized control. The regional advertisement fetched from the media server 115 is specified by an advertiser. Furthermore, the step 305 also includes fetching of an all-region advertisement from the media server 115. The all-region advertisement fetched can be distributed into the local television content so that the users of a specific geographical area can also view the all-region advertisement.

The step 305 further also includes generating a playlist including a combination of various regional advertisements and various all-region advertisements. The various advertisements included in the playlist can be fetched for distribution. The playlist including various advertisements can be specified by the advertiser or the studio editor.

At step 310, a pre-determined time period is specified within the central network feed. The pre-determined time period can indicate any part of the day for playing one of the regional advertisement, the local television content and a central television feed content. The media server allows the studio editor or the advertiser to specify the pre-determined time period for which one of the local television content, regional advertisement and an all-region advertisement can be played on the central network feed from the centralized control. The pre-determined time period is determined by inserting a Mark-in and a Mark-out montage into the central network feed. The Mark-in and the Mark-out montage enables playing one of the regional advertisement and the local television content for the pre-determined time period. The Mark-in and the Mark-out montage also enables playing central television feed content from the down-stream edge device 110b located at a local distribution center for the pre-determined time period The Mark-in and the Mark-out montage can be embedded within the central network feed by an edge device, for example, the edge device 110a located at the central studios for playing one of the regional advertisement and the local television content for the pre-determined time period. Further, the Mark-in and the Mark-out montage can be embedded within the playlist including a combination of various regional advertisements and various all-region advertisements for enabling playing of the various advertisements included in the playlist for the per-determined time period. The Mark-in and the Mark-out montage enable perfect synchronization for playing the local television content and the regional advertisement by the down-stream edge device 110b from the centralized control.

At step 315, the local television content that is fetched in step 310 is inserted into the central network feed for the pre-determined time period. Further, the regional advertisement fetched from the media server in step 310 is also inserted into the central network feed for the pre-determined time period. Furthermore, an all-regional advertisement fetched from the media server in step 310 can also be inserted into the local television content or the central network feed under centralized control. Moreover, the all-region advertisement can also be inserted into the local television content. This enables viewers of a specific geographical area viewing the local television content to also view the all-region advertisement. The insertion of the local television content and the regional advertisement into the central network feed allows for obtaining increased viewership of the advertisements and further an entire commercial potential can be tapped by smartly inserting advertisements during a commercial break. The entire commercial potential is tapped since viewership within a specific geographical area where the local television content is aired is higher and thus making it a local prime time. Further, the ability to use the local prime time to insert the regional advertisement leads to obtaining a maximized revenue.

In one embodiment, the method described in FIG. 3 can be performed to insert a regional audio advertisement and a local radio content under centralized control. A local radio content is fetched from a local storage device located at a radio broadcasting station. The regional audio advertisement can also be fetched from the media server 115. The regional audio advertisement fetched from the media server 115 is specified by the advertiser. Further, a pre-determined time period is specified for playing the regional audio advertisement on the centralized radio feed from the centralized control. A Mark-in and a Mark-out montage enables playing one of the regional audio advertisement and the local radio content for the pre-determined time period. The Mark-in and the Mark-out montage enable perfect synchronization for playing the local radio content and the regional audio advertisement by the radio broadcasting station from the centralized control. Further, the local radio content fetched is inserted into the centralized radio content for the pre-determined time period. Furthermore, the regional audio advertisement fetched from the media server is also inserted into the centralized radio feed for the pre-determined time period. Moreover, an all-region advertisement is also fetched from the media server and is inserted into the centralized radio feed. Further, the all-region advertisement can also be inserted into the local radio content. The insertion of the local radio content and the regional audio advertisement into the centralized radio feed allows for obtaining increased listenership of the audio advertisements and further an entire commercial potential can be tapped by smartly inserting audio advertisements during a commercial break of the radio channel.

The method specified in the present disclosure enables co-ordination for inserting a local television content and appropriate regional advertisement at appropriate time into a central network feed so that relevant advertisements are distributed to users. By inserting the local television content and appropriate regional advertisement into the central network feed, an increased viewership is obtained and thereby, the commercial break is utilized efficiently for obtaining maximized revenue.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A system for inserting a local television content or radio content and a regional advertisement under a centralized control the system comprising:
    a user interface for receiving a media plan from an advertiser;
    a media server comprising a memory that stores instructions, and a processor in responsive to the instructions, to insert at least one of a local television content and a regional advertisement under the centralized control, and wherein the processor, in responsive to the instructions, schedules at least one of the local television content and the regional advertisement for distribution into a central network feed for a pre-determined time period, and wherein the media server is on a cloud network, and wherein the pre-determined time period is specified by an advertiser through the user interface;
    one or more edge devices for fetching at least one of the local television content from a local storage device fetching at least one of an all-region advertisement from the media server and the regional advertisement from the media server, and inserting at least one of the local television content and the regional advertisement into the central network feed for the pre-determined time period, and wherein the one or more edge devices are further used to generate a playlist comprising a plurality of advertisements to be displayed during a commercial break and wherein the one or more edge devices are further used to embed a Mark-in mechanism and a Mark-out mechanism into the central network feed for insertion of at least one of the local television content and the regional advertisement into the central network feed for the pre-determined time period, and wherein the one or more edge devices are integrated with a plurality of standard play-out systems embedded at a plurality of distribution stations, and wherein the one or more edge devices are further used to embed a Mark-in and a Mark-out mechanism into a centralized radio feed for insertion of at least one of a local radio content and the regional advertisement into the centralized radio feed for the pre-determined time period, wherein the one or more edge devices are further used to insert the all-region advertisement into the local television content, and wherein the Mark-in and Mark-out mechanism contains predetermined audio cue tones or predetermined video image pattern within the playlist to begin an insertion of the regional advertisement into the central network feed for the pre-determined time period, and wherein the Mark-in and Mark-out mechanism is used to insert a local television content into a central feed for the pre-determined time period by the one or more edge devices, and wherein the Mark-in and Mark-out mechanism is used to pause and resume playing of the local television content from the centralized studio.

2. A method of insetting a regional advertisement and a local television content or radio content under a centralized control, the method comprises:
    fetching the local television content from a local storage device; specifying a pre-determined time period within a central network feed, and wherein the pre-determined time period is specified by an advertiser through a user interface, and wherein the pre-determined time period is determined by inserting a Mark-in and Mark-out montage into the central network feed;
    inserting the local television content for the pre-determined time period into the central network feed;
    generating a playlist comprising a plurality of advertisements to be displayed during a commercial break and wherein the plurality of advertisements comprises a combination of a plurality of regional advertisements and a plurality of all-region advertisements;
    inserting a regional audio advertisement and a local radio content under the centralized control;
    inserting an all-region advertisement for the pre-determined time period into at least one of the central network feed and the local television content;
    embedding a Mark-in and Mark-out mechanism for insertion of at least one of the local television content and the regional advertisement into the central network feed for the pre-determined time period; and
    embedding a Mark-in and Mark-out mechanism into a centralized radio feed for insertion of at least one of a local radio content and the regional advertisement into the centralized radio feed for the pre-determined time period;
    and wherein the Mark-in and Mark-out mechanism contains predetermined audio cue tones or predetermined video image pattern within the playlist to begin an insertion of the regional advertisement into the central network feed for the pre-determined time period, and wherein the Mark-in and Mark-out mechanism is embedded to pause and resume playing of the local television content from the centralized studio.

3. The method as claimed in claim 2, wherein the local television content is viewed by users of a specific geographical area.

4. The method as claimed in claim 2, wherein the local television content is broadcasted from a local cable station.

5. The method as claimed in claim 2 further comprises inserting the regional advertisement for the pre-determined time period into at least one of the central network feed and the local television content.

* * * * *